United States Patent [19]

Takeda

[11] Patent Number: 5,667,275

[45] Date of Patent: Sep. 16, 1997

[54] HEAD-REST APPARATUS

[75] Inventor: Nobuhiko Takeda, Aichi pref., Japan

[73] Assignee: Aisin Seiki Kabushiki Kaisha, Kariya, Japan

[21] Appl. No.: 425,048

[22] Filed: Apr. 19, 1995

[30] Foreign Application Priority Data

Apr. 21, 1994 [JP] Japan .................................. 6-083025

[51] Int. Cl.$^6$ ...................................................... A47C 1/10
[52] U.S. Cl. ............................................ 297/408; 297/391
[58] Field of Search ................................. 297/391, 408, 297/452.18

[56] References Cited

U.S. PATENT DOCUMENTS

| | | | |
|---|---|---|---|
| 4,190,291 | 2/1980 | Korger . | |
| 4,674,792 | 6/1987 | Tamura et al. | 297/408 |
| 4,678,232 | 7/1987 | Ishida et al. | 297/408 |
| 4,685,737 | 8/1987 | Deley et al. | 297/408 |
| 4,830,434 | 5/1989 | Ishida et al. | 297/408 |
| 4,840,428 | 6/1989 | Kobayashi et al. | 297/408 |
| 4,861,107 | 8/1989 | Vidwans et al. | 297/408 |
| 5,052,754 | 10/1991 | Chinomi | 297/408 |

FOREIGN PATENT DOCUMENTS

| | | |
|---|---|---|
| 1 580 677 | 1/1971 | Germany . |
| 1 680 316 | 9/1971 | Germany . |
| 26 41 470 | 3/1978 | Germany . |
| 42 18 967 | 12/1993 | Germany . |
| 38 21 867 | 11/1994 | Germany . |
| 2 298 134 | 8/1996 | Germany . |
| 4-50838 | 12/1992 | Japan . |
| 1161330 | 8/1969 | United Kingdom . |
| 1182523 | 2/1970 | United Kingdom . |
| 2 220 227 | 1/1990 | United Kingdom . |

*Primary Examiner*—Milton Nelson, Jr.
*Attorney, Agent, or Firm*—Burns, Doane, Swecker & Mathis, LLP

[57] ABSTRACT

A head-rest apparatus for being mounted on a seat-back in a vehicle to allow an occupant of the vehicle to rest their head and seat-cushion includes a stay for being supported on the seat-back; and a main portion including a frame and a pad that surrounds the frame, the frame being pivoted to the stay at oppositely located first and second portions of the frame to be rotatable in first and second opposite directions, the first and second portions of the frame having edge portions that are turned to provide the edge portions with a curved configuration.

16 Claims, 4 Drawing Sheets

HEAD-REST APPARATUS

FIELD OF THE INVENTION

The present invention relates to a head-rest apparatus and in particular to a head-rest apparatus for mounting on a seat of an automotive vehicle.

BACKGROUND OF THE INVENTION

A conventional head-rest apparatus is disclosed, for example, in Japanese Utility Model Publication No. Hei4 (1992)-50838 published on Dec. 1, 1992 after examination. In this conventional head-rest apparatus, a main body for supporting the head portion of an occupant is rotatably connected to a stay that is connected to a seat-back so as to adjust the position of the main body toward and away from the occupant. The main body has a frame which is pivoted to the stay and the frame is accommodated in a pad made of an elastic material.

In the above-described head-rest apparatus, the frame is produced by pressing and bending a flat sheet metal member, edge portions are necessarily formed in the frame. These edge portions can cause injury to the vehicle occupant. Thus, from the view point of occupant protection, a protection part is formed around the frame including the edge portions by blow molding resin around the frame. This resulting protection part, which is made of a hard synthetic resin, is then covered with the pad.

However, the aforementioned blow molding technique is a cumbersome process and increases the production cost of the head-rest apparatus.

SUMMARY OF THE INVENTION

A need exists, therefore, for a head-rest apparatus which is free from the disadvantage associated with forming a protection part between the frame and the pad.

A need also exists for a head-rest apparatus in which no edge portions are formed in the frame.

To address the foregoing needs, a head-rest apparatus for being mounted on a seat-back in a vehicle to allow an occupant of the vehicle to rest their head and seat-cushion comprises a stay for being supported on the seat-back; and a main portion including a frame and a pad that surrounds the frame, the frame being pivoted to the stay at oppositely located first and second portions of the frame to be rotatable in first and second opposite directions, the first and second portions of the frame having edge portions that are turned to provide the edge portions with a curved configuration.

BRIEF DESCRIPTION OF THE DRAWING FIGURES

The features and advantages of the present invention will be more apparent and more readily appreciated from the following detailed description of a preferred exemplary embodiment of the present invention, taken in connection with the accompanying drawings, in which.

DETAILED DESCRIPTION OF THE PREFERRED EMBODIMENT

An embodiment of the present invention will be described hereinunder in detail with reference to the accompanying drawing figures.

Figure 1:
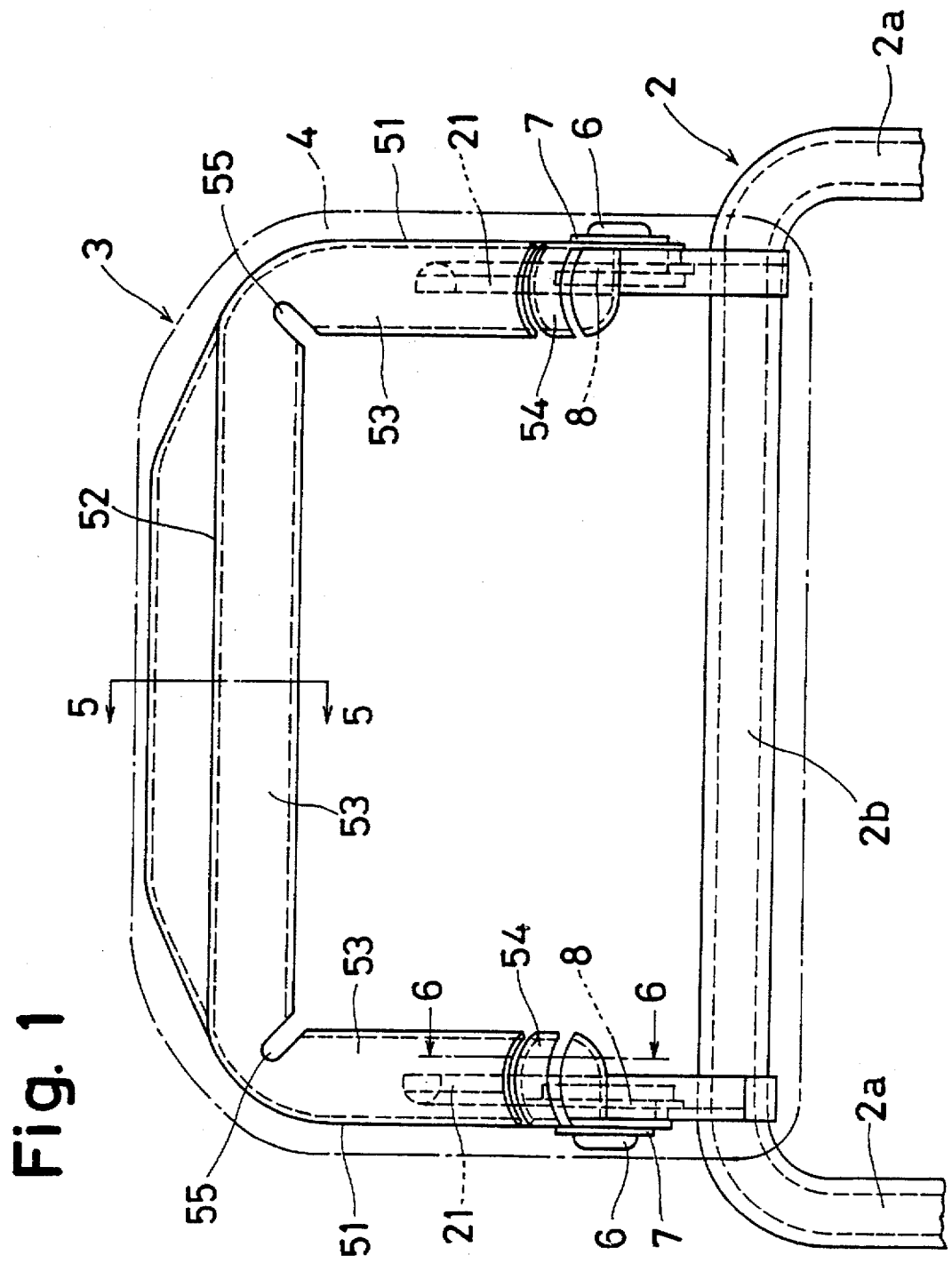
FIG. 1 is a front view of a head-rest apparatus according to the present invention.
Figure 2:
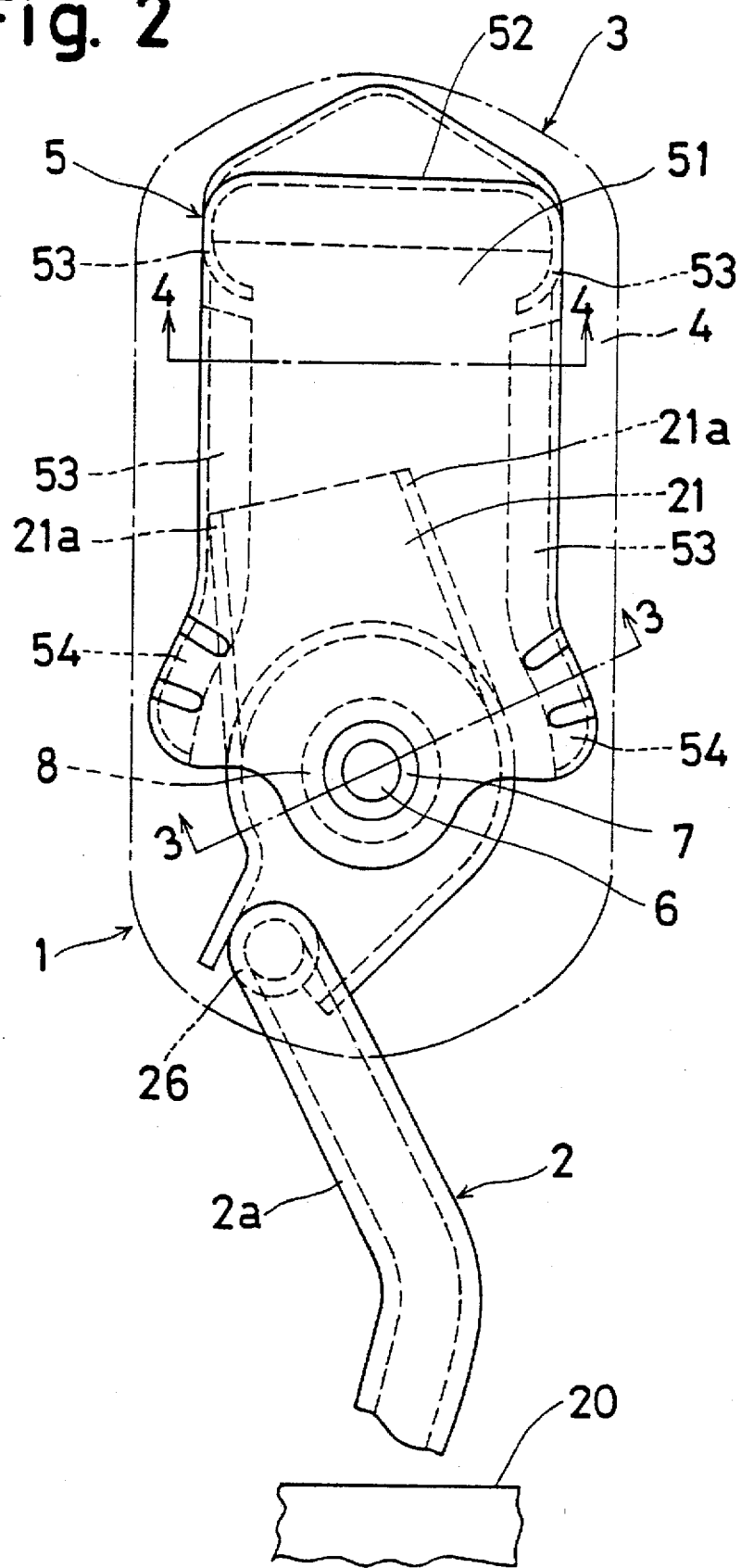
FIG. 2 is a side view of the head-rest apparatus shown in FIG. 1.

Referring first to FIGS. 1 and 2, a head apparatus 1 includes a stay 2 and a main portion 3.

The stay 2, which is in the form of a substantially inverted U-shaped construction, has a pair of laterally spaced leg portions 2a and 2a which are set to be movably inserted into a top end portion of a seat-back 20 of a seat (not shown), and an intermediate portion 2b which integrally connects the leg portions 2a and 2a. On the intermediate portion 2b, there are fixedly mounted a pair of laterally spaced brackets 21 and 21 which extends in the upward direction away from the leg portions 2a and 2a.

The main portion 3 of the head-rest apparatus 1 includes a pad 4 and a frame 5. The pad 4, which serves for supporting the head portion of an occupant (not shown), is made of a foaming synthetic resin and is foamed so as to accommodate integrally therein the frame 5. Thus, the pad 4 surrounds or encloses the frame 5. The frame 5, which is made of metal such as a stainless steel or other similar material, has a pair of laterally spaced vertical extension portions 51 and 51 and a horizontal extension portion 52 which connects integrally the vertical extension portions 51 and 51 to one another. Each of the vertical extension portions 51 and 51 has a width which is arranged in the thickness direction of the main body 3 corresponding to the horizontal direction in FIG. 2. The horizontal extension portion 52 also has a width which is arranged in the thickness direction of the main body 3 corresponding to the horizontal direction in FIG. 2.

Figure 3:
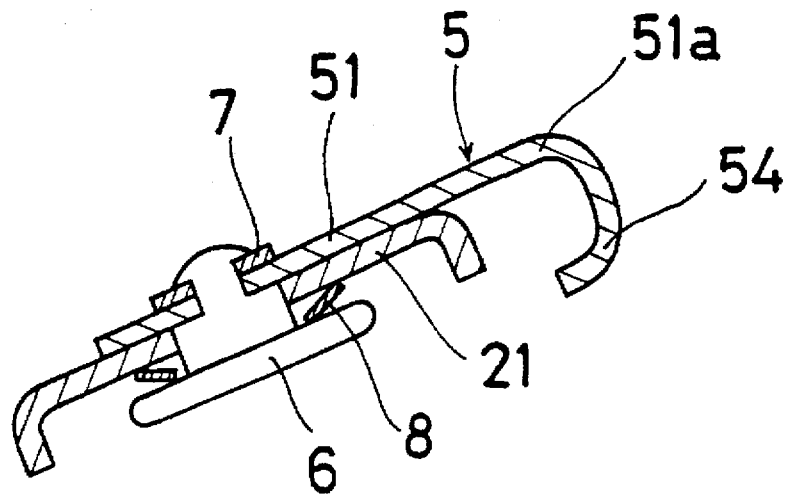
FIG. 3 is a cross-sectional view taken along the section line 3—3 in FIG. 2.
Figure 4:
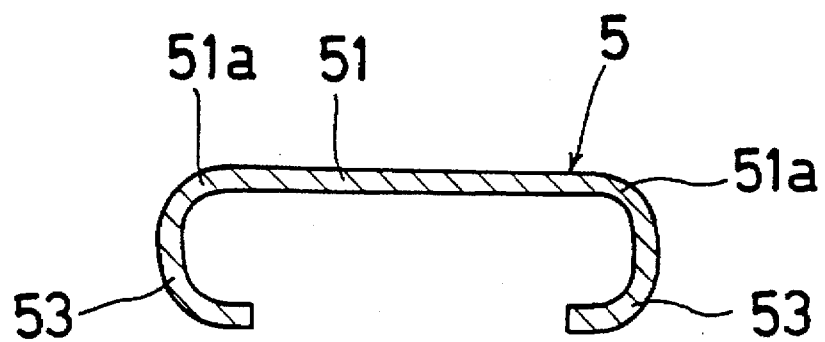
FIG. 4 is a cross-sectional view taken along the section line 4—4 in FIG. 2.

The frame 5 is positioned above the stay 2 in order that the vertical extension portions 51 oppose the respective brackets 21 and 21. As seen in FIG. 3 each bracket 21 and the corresponding vertical extension portion 51 are rotatably supported by a shaft of a common pin 6. Each bracket 21 and the corresponding extension portion 51 overlap one another as seen in FIG. 3. To prevent the extension portions 51 and the bracket 21 from separating from one another, a rivet head is provided on the distal end of the shaft of the pin 6 and a dish spring 8 is disposed between an enlarged opposite end of the pin shaft and the bracket 21. The dish spring 8 serves for generating friction between the bracket 21 and the corresponding vertical extension portion 51. Thus, unless a force is applied to the frame 5, the dish spring 8 prevents the frame 5 from rotating relative to the stay 2 and the position of the pad 4 remains unchanged. The dish spring 8 need only be positioned between the bracket 21 and the enlarged head of the pin 6 on one side of the main portion 3.

Under the foregoing condition in which the pad 4 is at a fixed position, when the pad 4 is urged back and forth or to the left and the right in FIG. 2, the frame 5 is brought into rotation about the pin 6 against the friction force between the bracket 21 and the vertical extention portion 51. As soon as the urging of the force applied to the pad 4 is interrupted or stopped due to the fact that the pad 4 reaches a desired position, the rotation of the frame 5 relative to the stay 2 is restricted or stopped by the friction force between the bracket 21 and the vertical extension portion 51 that is established by the dish spring 8. Thus, the pad 4 is fixed or retained at the resulting or desired position.

Figure 5:
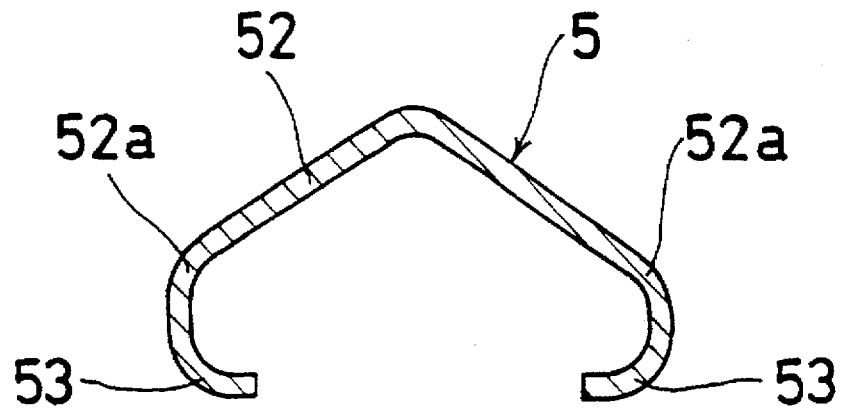
FIG. 5 is a cross-sectional view taken along the section line 5—5 in FIG. 2.
Figure 6:
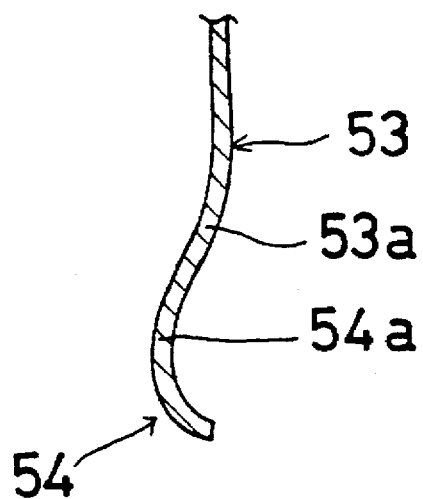
FIG. 6 is a cross-sectional view taken along the section line 6—6.

As seen in FIGS. 5 and 6, each distal edge portion 51a (52a) of the vertical extension portions 51 (the horizontal extention portion 52) is turned inwardly and terminates in an arc-shaped lip portion 53. Thus, the arc-shaped or generally C-shaped lip portions 53 of respective vertical extension portions 51 are turned towards one another. With respect to each of the vertical extension portions 51, the lower end portion 54 of each distal edge portion 51a is formed outwardly away from the bracket 21 to form an outwardly angled lower end portion 54 as seen in FIG. 2. Also, as seen in FIG. 6, the distal end of the lower end portions 54 are turned inwardly back towards the bracket 21 to terminate is an arc-shaped lip portion 54a.

It is to be noted that the arc-shaped lip portion 53 of the vertical extention portion 51 is engageble with the distal end portions 21a of the brackets 21 so as to restrict or limit the rotation range of the frame 5 relative to the stay 2.

The frame 5 including the pair of vertical extension portions 51 which each have the arc-shaped lip portions 53, the horizontal extension portion 52 which has the arc-shaped lip portions 53, and the pair of the angled downward extensions 54 at the lower end portions of each vertical extension portion 51 can be fabricated from a single piece flat sheet metal by suitable pressing and bending operation. It is to be noted that a slit 55 is formed at the corner between the distal end portions 51a of each vertical extension 51 and the distal end portions 52a of the horizontal extension portions 52. This facilitates the formation or the bending of the arc-shaped lip portions 53.

As a result of the above-described construction, the manufacturing procedure for the head-rest apparatus is simplificated and the production costs reduced. That is, because the distal edge portions 51a and 52a of the vertical and horizontal extension portions 51 and 52, respectively, are turned inwardly to present a curved or substantially rounded outwardly facing edge. Thus, it is no longer necessary to engage in the costly and time consuming effort of surrounding the frame with synthetic resin to protect the vehicle occupant.

The invention has thus been shown and described with reference to a specific embodiment, however, it should be noted that the invention is in no way limited to the details of the illustrated structures but changes and modifications may be made without departing from the scope of the appended claims.

What is claimed is:

1. A head-rest apparatus for being mounted on a seat-back in a vehicle to allow an occupant of the vehicle to rest their head comprising:

a stay for being supported on the seat-back; and a main portion that includes a frame and a pad that surrounds the frame, the frame being pivotally connected to the stay at oppositely located first and second portions of the frame to permit the frame to pivot in first and second opposite directions relative to the stay, the first and second portions of the frame having edge portions that are turned to provide the edge portions with a curved configuration, the curved configuration of the edge portions of the first and second portions limiting pivoting movement of the frame relative to the stay in both the first direction and second direction through contact of the edge portions of the first and second portions with portions of the stay.

2. A head-rest apparatus according to claim 1, wherein the frame includes a third portion that connects the first and second portions, the third portion having edge portions that are turned inwardly.

3. A head-rest apparatus according to claim 1, wherein the stay includes a pair of brackets, a part of the first portion of the frame overlapping one of the brackets and a part of the second portion of the frame overlapping the other bracket.

4. A head-rest apparatus according to claim 1, including friction producing means operatively associated with the stay and the frame for producing friction between the stay and the frame to retain the frame at a desired position relative to the stay.

5. A head-rest apparatus according to claim 4, wherein the stay includes a pair of brackets, a part of the first portion of the frame overlapping one of the brackets and a part of the second portion of the frame overlapping the other bracket.

6. A head-rest apparatus according to claim 5, wherein the pivotal connection of the frame to the stay includes a first pin pivotally connecting the first portion of the frame to the one bracket and a second pin pivotally connecting the second portion of the frame to the other bracket.

7. A head-rest apparatus according to claim 6, wherein the friction producing means includes a spring disposed between an enlarged portion of the first pin and the one bracket and a spring disposed between an enlarged portion of the second pin and the other bracket.

8. A head-rest apparatus for being mounted on a seat-back of a seat and on which an occupant of a vehicle can rest their head comprising:

a stay for being mounted on the seat-back, said stay including a pair of brackets extending; and a main portion that includes a frame and a pad which encircles the frame, the frame including a pair of spaced apart first extension portions and a second extension portion extending between the first extension portions, each of the first extension portions being pivotally mounted on one of the brackets for allowing the frame to pivot relative to the stay, said second extension portion having oppositely located edge portions extending along the length of the second extension portion, the oppositely located edge portions of the second extension portion being curved towards one another, each first extension portion having oppositely located edge portions extending along the length of the first extension portion, the oppositely located edge portions of each first extension portion being curved towards one another, the first extension portions and the second extension portion being made of a one-piece unitarily formed metal member.

9. A head-rest apparatus according to claim 8 further including a pair of angled downward extensions formed at lower end portions of each first extension portion, each angled downward extension being formed outwardly from the corresponding bracket.

10. A head-rest apparatus according to claim 8, wherein the frame includes a pair of corners each located between the second extension portion and one of the first extension portions, and including a slit formed at each corner.

11. A head-rest apparatus according to claim 8, wherein a part of one of said first extension portions overlaps the bracket to which the first extension portion is pivotally connected, a portion of the other of said first extension portions overlapping the bracket to which the other first extension portion is pivotally connected.

12. A head-rest apparatus according to claim 8, including friction producing means operatively associated with the stay and the frame for producing friction between the stay and the frame to retain the frame at a desired position relative to the stay.

13. A head-rest apparatus mountable on a seat-back of a seat for providing a rest for a head of an occupant of a vehicle, comprising:

a stay for being mounted on the seat-back, said stay including a pair of spaced leg portions connected together by an intermediate portion, and first and second brackets extending from the intermediate portion; and a main portion that includes a frame and a pad which encircles the frame, the frame including a pair of spaced apart first extension portions and a second extension portion extending between the first extension portions, one of the first extension portions being pivotally mounted on the first bracket and the other first extension portion being pivotally mounted on the second bracket for allowing the frame to pivot relative to the stay, and including friction producing means operatively associated with at least said first bracket and said one first extension portion for urging one of the first bracket and the one first extension portion into frictional engagement with the other of the first bracket and the one first extension portion so that the main portion is maintained in position relative to the stay through frictional engagement between the first bracket and the one first extension portion.

14. A head-rest apparatus according to claim 13, wherein a part of said one first extension portion overlaps the first bracket and a part of said other first extension portion overlaps the second bracket.

15. A head-rest apparatus according to claim 13, wherein the one first extension portion is pivotably mounted on the first bracket by way of a pin that extends through the one first extension portion and the first bracket, the other first extension portion being pivotably mounted on the second bracket by way of a pin that extends through the other first extension portion and the second bracket.

16. A head-rest apparatus according to claim 15, wherein the friction producing means includes a spring disposed between an enlarged portion of the first pin and the one bracket.

* * * * *